Charles W. Desaulniers
Stephen A. Splitz
INVENTORS

BY Elton Fisher

ATTORNEY

United States Patent Office 3,506,477
Patented Apr. 14, 1970

3,506,477
LAMINATE HAVING A LOW PERMEABILITY TO GASES
Charles W. Desaulniers, Franklin, and Stephen A. Splitz, Scituate, Mass., assignors to W. R. Grace & Co., New York, N.Y., a corporation of Connecticut
Continuation-in-part of application Ser. No. 601,656, Dec. 14, 1966. This application Feb. 11, 1969, Ser. No. 798,430
Int. Cl. B44d 1/16; B32b 19/02
U.S. Cl. 117—76                    18 Claims

ABSTRACT OF THE DISCLOSURE (1) A self-supporting laminate having a permeability to gases of less than about 2 cc.

$$(STP) \times mil/atm. \times m.^2 \times day$$

at about 35° C., said laminate consisting essentially of: (a) a substrate; and (b) a filled polymer film, the film consisting essentially of a film-forming polymer filled with an organic-modified clay-like mineral filler, bonded to said substrate;

(2) A self-supporting laminate having a permeability to gases of less than about 2 cc.

$$(STP) \times mil/atm. \times m.^2 \times day$$

at about 35° C., said laminate consisting essentially of: (a) a substrate; (b) a filled polymer filled with an organic-modified clay-like mineral filler, bonded to said substrate; and (c) an unfilled polymer film consisting essentially of a film-forming polymer, bonded to the filled polymer film; and (3) A self-supporting laminate having a permeability to gases of less than about 2 cc.

$$(STP) \times mil/atm. \times m.^2 \times day$$

at about 35° C., said laminate consisting essentially of: (a) a substrate; (b) a first film consisting essentially of an organic-modified clay-like mineral filler, bonded to the substrate; and (c) a second film consisting essentially of a film-forming polymer, bonded to the first film.

CROSS REFERENCE TO RELATED APPLICATION

This is a continuation-in-part of copending application Ser. No. 601,656, filed Dec. 14, 1966 and now abandoned.

BACKGROUND OF THE INVENTION

This invention is in the field of laminates having a low permeability to gases.

SUMMARY OF THE INVENTION

In summary, this invention is directed to a self-supporting laminate having a permeability to gases of less than about 2 cc.

$$(STP) \times mil/atm. \times m.^2 \times day$$

(preferably less than about 1 cc.

$$(STP) \times mil/atm. \times m.^2 \times day$$

and more preferably less than about 0.5 cc.

$$(STP) \times mil/atm. \times m.^2 \times day)$$

at about 35° C., said laminate consisting essentially of:
  (a) A substrate; and
  (b) A first filled polymer film, the film consisting essentially of a film-forming polymer filled with an organic-modified clay-like mineral filler, bonded to said substrate.

BRIEF DESCRIPTION OF THE DRAWINGS

The drawings are schematic representations of the laminates of the instant invention.

DESCRIPTION OF THE PREFERRED EMBODIMENTS

Figure 1:
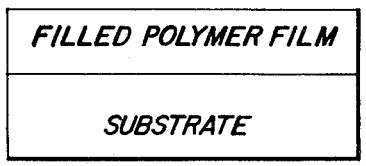

In preferred embodiments of the invention set forth in the above summary:

(1) The substrate is a member selected from the group consisting of paper, paperboard, polyolefins, polyvinyl chloride and its copolymers, polyvinylidene chloride copolymers, polyesters, polyvinyl acetate and its copolymers, cloth, wood, and the like;

(2) The weight ratio of polymer to organic-modified clay-like mineral filler in the first filled polymer film is about 1:0.02–200 (preferably about 1:0.5–99);

(3) The substrate is about 0.05–50 mils (preferably about 0.10–20 mils) thick and the first filled polymer film is about 0.005–2 mils (preferably about 0.05–0.50 mils) thick;

(4) The polymer component of the first filled polymer is a member selected from the group consisting of polyvinylidene chloride copolymers, polyvinyl acetate and its copolymers, polyvinyl methyl ether, and the like;

(5) The organic-modified clay-like mineral is an organic-modified clay-like mineral selected from the group consisting of vermiculite, mica, platelike clays, and platelike talc.

In another preferred embodiment (Embodiment A) this invention is directed to a self-supporting laminate having a permeability to gases of less than about 2 cc.

$$(STP) \times mil/atm. \times m.^2 \times day$$

(preferably less than about 1 cc.

$$(STP) \times mil/atm. \times m.^2 \times day$$

and more preferably less than about 0.5 cc.

$$(STP) \times mil/atm. \times m.^2 \times day)$$

at about 35° C., said laminate consisting essentially of:
  (a) A substrate;
  (b) A first filled polymer film, said film consisting essentially of a film forming polymer filled with an organic-modified clay-like mineral filler, bonded to said substrate; and
  (c) A second polymer film, the second film consisting essentially of a film-forming polymer, bonded to the first polymer film.

In specially preferred embodiments of Embodiment A, supra:

(1) The substrate is a member selected from the group consisting of paper, paperboard, polyolefins, polyvinyl chloride and its copolymers, polyvinylidene chloride copolymers, polyesters, polyvinyl acetate and its copolymers, cloth, wood, and the like;

(2) The weight ratio of polymer to organic-modified clay-like mineral filler in the first filled polymer film is about 1:0.02–200 (preferably about 1:0.5–99).

(3) The substrate is about 0.05–50 mils (preferably about 0.10–20 mils) thick, the first filled polymer film is about 0.005–2 mils (preferably about 0.05–0.50 mil) thick and the second polymer film is about 0.20–50 mils (preferably about 0.05–20 mils) thick;

(4) The polymer component of the first filled polymer is a member selected from the group consisting of polyvinylidene chloride copolymers, polyvinyl chloride and its copolymers, polyvinyl acetate and its copolymers, polyvinyl methyl ether, and the like;

(5) The organic-modified clay-like mineral is an organic-modified clay-like mineral selected from the group consisting of vermiculite, mica, platelike clays, and platelike talc; and (6) The second polymer film is a polymer selected from the group consisting of polyvinyl chloride and its copolymers, polyvinylidene chloride copolymers, polyvinyl acetate and its copolymers, vinyl acrylic terpolymers, and the like.

Figure 3:
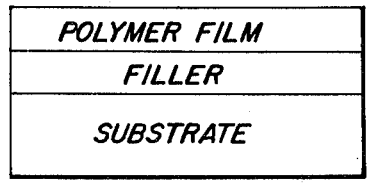

In another preferred embodiment (Embodiment B) this invention is directed to a self-supporting laminate (see FIG. 3) having a permeability to gases of less than about 2 cc. (STP) $\times$ mil/atm. $\times$ m.$^2$ $\times$ day (preferably less than about 1 cc. (STP) $\times$ mil/atm. $\times$ m.$^2$ $\times$ day and more preferably less than about 0.5 cc. (STP) $\times$ mil/atm. $\times$ m.$^2$ $\times$ day) at about 35° C., said laminate consisting essentially of:

(a) A substrate;

(b) A first film, said first film consisting essentially of an organic-modified clay-like mineral filler, bonded to the substrate; and (c) A second film, said second film consisting essentially of a film-forming polymer, bonded to the first film.

In specially preferred embodiments of Embodiment B, supra:

(1) The substrate is a member selected from the group consisting of paper, paperboard, polyolefins, polyvinyl chloride and its copolymers, polyvinylidene chloride copolymers, polyesters, polyvinyl acetate and its copolymers, cloth, wood, and the like;

(2) The organic-modified clay-like mineral is an organic modified clay-like mineral selected from the group consisting of vermiculite, mica, platelike clays, and platelike talc;

(3) The second film is a member selected from the group consisting of polyvinyl chloride and its copolymers, polyvinylidene chloride copolymers, polyvinyl acetate and its copolymers, vinylacrylic terpolymers, and the like; and (4) The substrate is about 0.05–50 mils (preferably about 0.10–20 mils) thick, the first film is about 0.002–0.20 mil (preferably about 0.01–0.08 mil) thick and the second film is about 0.20-50 mils (preferably about 0.50-20 mils) thick.

DETAILED DESCRIPTION OF THE INVENTION

This invention relates to a novel and useful coating and laminating process. More particularly, it relates to a coating and laminating process whereby a film having an exceptionally low permeability to gases including oxygen, nitrogen, water vapor, carbon dioxide, and the like is prepared.

It is an object of this invention to prepare laminates having a lower permeability to gases including oxygen.

It is an object of this invention to use organic-modified clay-like minerals (as defined hereinafter) and film-forming polymers to prepare laminates having a low permeability to gases.

It is an object of this invention to prepare a self-supporting laminate (see FIG. 1) having a low permeability to gases by a process comprising applying at least one coating of an organic-modified clay-like mineral-filled film-forming polymer-diluent system selected from the group consisting of dispersions and solutions to a substrate, and, after applying such coating, adjusting the thickness of the coating, and drying the coating to a solid state, whereby a film is formed, the film being laminated to the substrate. If desired, the substrate and film can be separated to yield a self-supporting film having a low permeability to gases.

Figure 2:
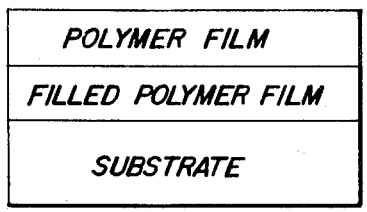

It is an object of this invention to prepare a self- supporting laminate (see FIG. 2) having a low permeability to gases by a process comprising applying at least one coating of an organic-modified clay-like mineral-filled film-forming polymer-diluent system selected from the group consisting of dispersions and solutions to a substrate, and, after applying such coating, adjusting the thickness of the coating, drying the coating to a solid state, whereby a film is formed, the film being laminated to the substrate, applying at least one coating of a film-forming polymer-diluent system selected from the group consisting of dispersions and solutions to the afore-said film, and, after applying such coating, adjusting the thickness of said coating of film-forming polymer-diluent system, and drying said coating of film-forming polymer-diluent system to the solid state, whereby a second film is formed, said second film being laminated to the film prepared from the aforesaid filled film-forming polymer-diluent system. If desired, the substrate and film can be separated to yield a self-supporting laminate film having a low permeability to gases.

It is an object of this invention to use at least one quaternary ammonium compound (e.g., a salt or base), having the formula

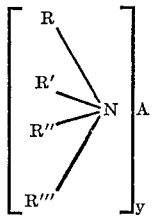

wherein R, R', R'', and R''' are organic radicals selected from the group consisting of aliphatic radicals—including alkyl, cycloalky, alkyl-cycloalkyl, and cycloalkyl-alkyl radicals—having 1–20 carbon atoms; R, R', R'', and R''' can all be identical, can all be different, or two or three of said radicals can be identical; A is an anion (e.g., chloride, bromide, fluoride, iodide, acetate, hydroxide—OH$^-$—, sulfate, phosphate); $y$ is an integer equal (but opposite in sign) to the oxidation number (valence number) of anion A; for example, where A is chloride, iodide, hydroxide, or acetate, $y$ is 1; where A is sulfate, $y$ is 2; to modify a clay-like mineral (as defined hereinafter)—i.e., to prepare an "organic-modified" clay-like mineral excellently adapted for use in the preparation of the laminates of our invention.

It is another object of this invention to prepare a transparent glass-clear laminated film from polymer-diluent-filler systems. It is another object of this invention to prepare films and laminates for use in packaging foods and other materials which should (or must) be protected from contact with the atmosphere. It is still another object of this invention to prepare glass-clear transparent laminate films from polymer-diluent-filler systems prepared from film-forming polymers, whereby the resulting films have extremely low permeability (i.e., permeabilities of less than 2, or 1, or 0.5 cc. (STP) $\times$ mil/atm. $\times$ m.$^2$ $\times$ day at about 35° C.) to gases including oxygen, air, water vapor, carbon dioxide, and the like, and laminates prepared by methods set forth herein have such properties.

Still other objects will, as a consequence of our disclosure, be readily apparent to those skilled in the art.

We have found that clay-like minerials existing in the form of platelets or particles having a platelike structure (i.e., existing in the form of platelets having an axial ratio of about 20–300:1 and a maximum length of about 20–30 microns), being substantially insoluble in the polymer-diluent system to which they are added or brought into contact in the process of this invention can be treated to produce organic-modified mineral-fillers which are sufficiently resistant to the hydrating and disintegrating action of water—including water vapor to be used as "fillers" in the process of our invention. We have also found that clay-like minerals having the above-defined platelike structure (e.g., platy clays, mica, vermiculite, and the like) are, unless modified, generally too susceptible to the hydrating and disintegrating action of water vapor present in the atmosphere to be satisfactory for use as "fillers" in the process of our invention. Films prepared with such platelike minerals which had not been modified were substantially nonpermeable to dry gases, but such films were permeable to moist gases (i.e., gases having a relative humidity of about 50–95% at about 35° C.). We have found that minerals (including clay) which do not have a platelike (or platelet) structure are not satisfactory for use in the process of this invention because laminates made therefrom have a permeability to gases which is too high. Hence, as used herein, the term clay-like minerals is limited to those clay-like minerals which have a platelike (or platelet) structure as defined supra.

By the term "filler," (unless said term is otherwise defined, qualified or explained where used) we mean at least one organic-modified clay-like mineral having a platelike structure and which, where incorporated into a polymer-diluent system comprising solutions and dispersions (including suspensions, emulsions, and latexes) of film-forming polymers at concentrations of 20–60% render films made therefrom substantially nonpermeable to gases such as oxygen, nitrogen, air, water vapor, carbon dioxide, and the like. By the term "killer" we also mean at least one substance selected from the aforesaid organic-modified materials which, where present as a layer laminated, or bonded, between at least two layers of film formed from such polymer-diluent systems, renders such laminate substantially nonpermeable to gases including those listed supra.

Clay-like minerals having a platelike structure which have given excellent results where converted to organic-modified minerals and used as fillers in the process of this invention include mica, vermiculite, and clays having a platelike structure—especially bentonite.

The term "filled," as used herein (unless otherwise defined, explained, limited, or qualified where used) when applied to a film (e.g., as in the terms "filled film" or "a filled polymer film") means a polymer film filled with or containing at least one organic-modified clay-like mineral having a platelike structure.

By the terms "organic-modified mineral" and "organic-modified mineral having a platelike structure," and "organic-modified clay-like mineral" we mean a clay-like mineral having a platelike structure (as defined supra) which has been treated with a solution or suspension of at least one organic quaternary ammonium compound, (e.g., a salt or base), having the formula

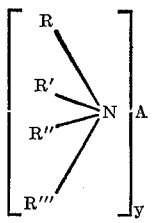

wherein R, R', R", and R''' are organic radicals selected from the group consisting of the aliphatic radicals having 1–20 carbon atoms; R, R', R", and R''' can all be identical, can all be different, or two or three of said radicals can be identified; A is an anion (e.g., chloride, bromide, fluoride, iodide, acetate, hydroxide —OH—, sulfate, phosphate); $y$ is an integer equal (but opposite in sign) to the oxidation number (valence number) of anion A; for example, where A is chloride, iodide, hydroxide, or acetate, $y$ is 1; where A is sulfate, $y$ is 2; thereby to modify ("organic-modify") the thus treated mineral and render the thus treated mineral, where used in the process of our invention, substantially resistant to the disintegrating action of moisture including water vapor. In other words, organic modification of clay-like mineral having a platelike structure converts such minerals into excellent fillers for us in the process of the instant invention. We prefer to wash organic-modified minerals to remove soluble impurities therefrom, thereby to further improve the moisture resistant characteristics of such modified minerals where used as fillers in the process of this invention.

Typical examples of quaternary ammonium compounds which gave excellent results where used to produce organic-modified minerals having a platelike structure are; tetramethyl ammonium iodide, tetraethyl ammonium chloride, tetrapropyl ammonium hydroxide, dimethyl dibutyl ammonium iodide, tributyl monomethyl ammonium acetate, dimethyl monoethyl dodecyl ammonium sulfate, methyl ethyl propyl butyl ammonium phosphate, Arquad 2C (dialkyl $C_{12}$, $C_{14}$ dimethyl quaternary ammonuim chloride), Arquad 2HT (dialkyl $C_{16}$, $C_{18}$ dimethyl quaternary ammonium chloride), tetradecyl ammonium hydroxide, trimethyl monoalkyl ammonium chlorides where the alkyl radical other than the methyl radicals contains about 12–18 carbon atoms, dimethyl alkyl ammonium chlorides where the alkyl radical other than the methyl radicals contain about 8–18 carbon atoms. As a consequence of this disclosure, numerous other quaternary ammonium compounds suitable for use in the process of our invention will be readily apparent to those skilled in the art.

The quaternary ammonium compounds applied to dispersions of minerals having a platelike structure to produce organic-modified mineral having a platelike structure suitable for use as fillers in the process of this invention can be applied while dissolved in or suspended in (or partially dissolved and partially suspended in) media such as water, alcohols, halogenated hydrocarbons, hydrocarbons, tetrahydrofuran, mixtures thereof, and the like.

We have also found that the acid form of ion exchange resins can be treated with quaternary ammonium compounds, thereby to produce ion exchange resins in which at least a part of the hydrogen ions have been replaced by quaternary ammonium ions to form ion exchange resins which can be used to produce organic-modified clay-like minerals. Passing dispersions of clay-like minerals having platelike structures through columns containing such quaternary ammonium-treated ion exchange resins has produced organic modified clay-like minerals which make excellent fillers for use in the process of this invention.

We have found that modifying naturally occurring or synthetic minerals having a platelike structure (e.g., platy clays, vermiculite, and mica) by treating such minerals with quaternary ammonium compounds renders the thus formed organic-modified minerals having a platelike structure hydrophobic (organophilic). Accordingly, where applying a coating, or layer, of the thus modified mineral onto a plastic film for preparing the laminates of our invention we prefer to apply the modified mineral as a dispersion of such organic-modified mineral in an organic solvent or mixture of organic solvents rather than as a dispersion of such modified mineral in water. However, in one embodiment of our invention, we have applied coatings, or layers, of the thus treated minerals from aqueous dispersions thereof by incorporating a substantial quantity of a wetting agent selected from the group consisting of sodium lauryl sulfate, ammonium salts of alkyl acid phosphates, sodium alkyl sulfonates including sodium dodecyl benzene sulfonate, ammonium alkyl acid phosphate, and ammonium polystyrene sulfonate. Other wetting agents suitable for use in this embodiment of our invention will, as a consequence of this disclosure, be readily apparent to those skilled in the art.

By the term "filled film-forming polymer-diluent system," we mean a polymer-diluent system to which about 5–95% (based on the total weight of the system), of filler as defined supra, has been added.

We have found that there are three general methods by which the laminates of this invention can be prepared, these are:

First general method

To a polymer-diluent system prepared from a film-forming polymer and having a solid content of about 5–70%, we add a filler, which is insoluble in the polymer-diluent system, in such quantity as to form a polymer-diluent-filler system comprising about 5–95% filler based on the weight of the polymer-filler components of the system—said filler being an organic-modified clay-like mineral having a platelet or platelike shape, i.e., an axial ratio (length to thickness) of about 20–300:1 and a maximum length up to about 20–30 microns. We have obtained excellent results with such particles and with particles having lengths of about 0.005–5 microns; we have also obtained optimum results with particles having a length of about 0.01–1 micron. Organic-modified fillers having a platelike structure which we have found to give excellent results in the process of our invention include organic-modified vermiculite, mica, and clays having a platelike structure (e.g., bentonite). Where using clay-like minerals (i.e., vermiculite, mica, clays, and the like having a platelike structure as fillers for laminates, including laminate films, we have found that the permeability to humid, or moist, air of such laminates can be greatly decreased by modifying said minerals; i.e., by treating the minerals with quaternary ammonium compounds as described supra. As used herein the term "modifying" clay-like minerals means to treat said minerals with at least one such quaternary ammonium compound, whereby the permeability to humid air of laminates filled with the thus treated minerals is substantially less than that of similar laminates filled with the same minerals which have not been treated with at least one such quaternary ammonium compound. The terms "modified fillers" and "organic-modified fillers" mean clay-like minerals having a platelike structure which have been subjected to the abovementioned modifying treatment.

Since commercially available clay-like minerals contain impurities (such as silica, particles of rock, and some very large particles of clay-like minerals), we have found that such minerals should be refined before using them in the process of this invention. Although many ways to accomplish such refining will be readily apparent to those skilled in the art, we prefer to do this by forming a suspension of about 0.1–10% of the clay-like mineral (preferably about 2%) in water, agitating the resulting mixture vigorously, and adding a small amount (0.1–5% based on the weight of the clay-like mineral present) of a dispersing and exfoliating agent such as sodium polyphosphate, sodium hydroxide, sodium carbonate, sodium oxalate, sodium phosphate, or the like to the resulting slurry, thereby to disperse and exfoliate the clay-like mineral. After thorough mixing we separate, for example by centrifuging or by decanting, the resulting dispersion (or slurry) from the few remaining large particles (including a small quantity of mineral which was not exfoliated).

The thus treated dispersion is ready for treatment with a solution of at least one quaternary ammonium compound, whereby the properties of the filler (especially its resistance to water vapor) are improved. We prefer to conduct such treatment by adding to the dispersion of clay-like mineral a solution or suspension of at least one quaternary ammonium compound, while stirring the dispersion of clay-like mineral as the solution or dispersion of quaternary ammonium compound is added slowly thereto. The mineral dispersion will take on a more and more flocculated character as the quaternary ammonium compound is added until flocculation is substantially complete. We then separate the thus treated clay-like mineral by a conventional method such as decantation, filtration, or centrifugation, and wash the thus separated clay-like material to remove salts or other impurities which are present in the mother liquor or adhering to the clay-like mineral.

Where using a modified clay-like mineral as filler in a polymer-diluent system where the addition of water will not produce harmful results (e.g., the coagulation or precipitation of the polymer, or the excessive dilution of the resulting polymer-diluent-filler system), an aqueous dispersion (containing about 0.5–8% solids, preferably about 2–5% solids) of the modified mineral in water (to which we have added sufficient wetting agent to form a dispersion of the modified material in the water) can be added to a film-forming polymer-diluent system.

We have found that, because of the hydrophobic nature of organic-modified clay-like minerals, about 10–30%, based on the weight of the organic-modified mineral, of a wetting agent should be added to the water in which such modified mineral is to be suspended. Less wetting agent generally does not produce a good dispersion of such modified mineral in water, and more wetting agent serves no useful purpose and increases the cost of the process. Wetting agents which have given excellent results include sodium dodecylbenzene sulfonate, sodium vinyl sulfonate, 2-methylhexyl amine hydrochloride, sodium polyphosphate, and polyethylene imine. Other wetting agents will, on the basis of our disclosure, be readily apparent to those skilled in the art.

Generally the organic-modified clay-like mineral is recovered from the dispersion in which it was prepared; the recovered modified clay-like mineral is dried. The thus dried modified clay-like mineral-filler is then added to the polymer-diluent system to yield a polymer-filler system.

As stated supra, we use a polymer-diluent system containing about 5–70% solids. To this we add sufficient filler to produce a polymer-diluent-filler system in which the filler constitutes 5–95% of the weight of said polymer-diluent-filler system.

We prepare a laminate by applying at least one coating of the film-forming polymer-diluent-filler system to a substrate or surface and draw the wet (i.e., diluent-containing) coating to the desired thickness with conventional apparatus (e.g., a Meyer Bar, Baker Film Applicator Bar, doctor bar, or the like) in a conventional manner. We prefer to draw each wet coating to such thickness that on drying it will yield a film of filled polymer (bonded to the substrate) about 0.05–3 mils thick (1 mil is 0.001 inch). We then dry said first coating at such a temperature that the "moisture" (i.e., diluent) will be evaporated from the film but that the polymer will not be burned, charred, or otherwise decomposed by heat, thereby to form a laminate which is substantially nonpermeable to gases such as air, oxygen, nitrogen, water vapor, carbon dioxide, and the like, said laminate comprising a film of filled polymer laminated, or bonded, to said substrate, or surface. Said film can, if desired, be stripped from said surface if said surface is a smooth surface such as polished glass, smooth metal, and the like.

The drying temperature will obviously depend upon the type of polymer from which the polymer-diluent system was made, upon the boiling point and vapor pressure of the diluent, and upon the residence time in the drying oven (or drying or heating zone). We have found that temperatures ranging from about 100 to about 140° C. have given excellent results; however, temperatures considerably lower than this and temperatures a great deal higher—particularly where using short residence time in the heating zone—have also been used with excellent results. In some instances, e.g., to fill pinholes formed in the filled polymer film bonded to the substrate, we add a second coating of the aforesaid polymer-diluent-filler system. We draw the second coating down and dry it according to the procedure used with the first coating. We usually make the second film about the same thickness as the first; however, it can be thinner or thicker as choice dictates. We can, if desired, add additional, i.e., a third, fourth, fifth, etc. coating—after drawing down and drying each underlaying coating. We can, if desired, strip the thus formed film from the substrate, or support on which it was formed and recover a laminate film comprising the aforesaid first film and the aforesaid second film laminated, or bonded, together. Alternatively, we can leave the resulting film laminated to the substrate—especially where the substrate is paper, paperboard, cloth, wood, or plastic film.

Second general method

In another embodiment of this invention we do not add filler having a platelike structure to the film-forming polymer-diluent system. Instead, we modify the general procedure described supra by using a polymer-diluent system to which no filler has been added. Said polymer-diluent system is of the type described supra and has a polymer content of about 5–70%. We coat a substrate (e.g., a substrate of the type mentioned supra) with the polymer-diluent system and draw the resulting wet coating to a thickness which will yield a first polymer film, or first polymer layer, of about 0.05–3 mil dry thickness, and dry said wet coating. In some instances after drying this coating we prefer to apply a second coating, or layer, of the polymer-diluent system on top of the thus prepared first dry film, or dry layer. The resulting second layer, or second film, can have a dry thickness about the same as, or thicker, or thinner than that of the first layer. After drying the first layer (or the second or subsequent, i.e., third, fourth, etc., layer where a second or subsequent layer is used) we coat the thus dried film with a dispersion of filler (i.e., modified clay-like mineral). (Where only one layer of the polymer-diluent system is used, we coat said layer with said dispersion of filler.) Said filler is dispersed in a medium in which the filler is substantially insoluble. Some slight solubility of the polymer is permissible, in fact, desirable. We prefer to draw the coating of said filler down to such wet thickness that when dry it will have a thickness of about 0.03–0.2 mil. We then dry this wet coating, or film, under such conditions that will render it substantially dry but under conditions of temperature that will *not* burn or otherwise damage the polymer or the filler. We have found that temperatures of about 100 to about 140° C. give excellent results; however, we have also obtained excellent results with higher and lower temperatures depending upon the residence time of the film in the heated zone and on the vapor pressure of the medium being evaporated. Subsequently, we apply a coating of the polymer-diluent system and draw it to such thickness that it will yield a film having a dry thickness of 0.05–3 mil on top of the thus dried coating of filler. We dry this coating until it is substantially free of diluent but under such conditions that neither the polymer nor the filler is burned, charred, or otherwise damaged by the drying process. In some instances, we prefer to put a second coating, or layer, of the polymer-diluent system upon the coating, or layer, which we have previously applied and dried on top of the coating of platelike filler. Where applying such additional coating of polymer-diluent system, said coating can be the same thickness as the previous coating or it can be thicker or thinner. If desired, a third, fourth, fifth, etc. coating of the polymer-diluent system can be applied and drawn down and dried in the usual manner.

Third general method

In still another embodiment of this invention we prefer to use the general method outlined in the second general method, supra, except that we use a slurry of clay-like mineral which has not been modified by treating with a quaternary ammonium compound. Where using this procedure one or two coatings of the polymer-diluent system are applied, drawn down, and dried as before and a coating of a suspension of clay-like mineral which has not been modified by treatment with a quaternary ammonium compound is applied on top of the thus prepared polymer film; said coating is drawn down to produce a film which will have a dry thickness of about 0.03–0.2 mil. This material is then dried and treated with a solution or suspension of a quaternary ammonium compound, washed with water, dried, and coated with one or two layers of film-forming polymer-diluent system using the general procedure outlined where discussing the second general method, supra.

Diluents which we have found to be especially useful in the process of this invention include: water, tetrahydrofuran, carbon tetrachloride, ethylene dichloride, methanol, ethanol, isopropyl alcohol, toluene, xylene, acetonitrile, hexane, heptane, dimethyl formamide, and dimethyl sulfoxide. Other diluents will, on the basis of the disclosures presented in this patent application, be readily apparent to those skilled in the art.

Film-forming polymers with which we have obtained excellent results include homopolymers of vinyl chloride, copolymers of vinylidene chlorides with monomers selected from the group consisting of methyl acrylate, ethyl acrylate, acrylamide, and acrylonitrile, homopolymers of vinyl acetate and copolymers of vinyl acetate with monomers selected from the group consisting of methyl acrylate, ethyl acrylate, acrylamide, and acrylonitrile. We have also obtained excellent results using copolymers in which polyvinyl chloride was the principal constituent. Where using copolymers of vinylidene chloride, we prefer to use those in which polyvinylidene chloride constitutes the major component; however, we have obtained excellent results with copolymers of vinylidene chloride in which the vinylidene chloride is not the major component. Where using the copolymers of vinyl acetate, we prefer to use those in which polyvinyl acetate is the major component; however, we have obtained excellent results with copolymers of vinylidene chloride in which the vinylidene chloride is not the major component. Where using the copolymers of vinyl acetate, we prefer to use those in which polyvinyl acetate is the major component; however, we have obtained excellent results with such copolymers in which the polyvinyl acetate was not a major component.

Numerous other polymers and copolymers which will be excellent results in the process of this invention will, as a consequence of the disclosure contained herein, be readily apparent to those skilled in the art.

We have obtained excellent results where using aqueous dispersions of film-forming polymers, i.e., film-forming latexes, in the process of this invention. Excellent results have been obtained with such latexes in which the polymer particles have diameters ranging from about 200 A. (Angstrom units) to about 100,000 A.; however, we prefer to use polymer particles ranging in diameter from about 700 A. to about 4,500 A.

As a consequence of the disclosures presented herein, numerous modifications of the procedures and embodiments of this invention will be readily apparent to those skilled in the art.

We prefer to measure the permeability of films to gases and vapors with a device known as an Amicon Permeameter. Said device measures the rate of change of pressure in a previously evacuated space, of know volume, downstream of the film whose permeability is being measured. Said film is positioned between two sections of a permeability cell; said cell is closed and sealed by bolting two outer flanges together. The sealed cell is attached to a vacuum line, attached to a vacuum pump, and evacuated to a pressure of $1 \times 10^{-4}$ mm. of mercury. After allowing sufficient time for outgassing, oxygen, or other gas or vapor, is admitted at a pressure of about 500 mm. of mercury to the portion of the cell which is upstream of said film. The portion of the cell which is downstream of the film is then disconnected from the vacuum line, and the rate of change in pressure of said downstream portion of said cell is recorded using a conventional differential pressure sensor. Said pressure sensor records pressure changes as low as 0.01 micron per minute. Permeability is calculated from the slope of a curve obtained by plotting downstream pressure vs. time in minutes. Other procedures for measuring the permeability of films will be readily apparent to those skilled in the art.

This invention will be further illustrated by the following examples which are illustrative only and which are not intended to limit the scope of the invention.

EXAMPLE I

A suspension of about 2% of bentonite clay in water at about 60° C. was agitated with rapid stirring and treated with sodium polyphosphate as a dispersing and exfoliating agent. About 0.5% sodium polyphosphate, based on the weight of the clay present, was added. When dispersion was substantially complete, after about 2 hours, stirring was discontinued and a small amount of larger unexfoliated clay particles and a few particles of rock, silica, and the like were allowed to settle out. The dispersion was decanted from the particles which had settled, thereby to obtain a dispersion of a refined, or purified, clay-like material—purified bentonite clay. The solid content of the slurry was adjusted to about 0.7% by adding water. A solution of Arquad 2C (a dialkyl $C_{12}$, $C_{14}$ dimethyl quaternary ammonium chloride in isopropyl alcohol and water) was added to the clay suspension. The suspension became more and more viscous as the quaternary salt was added until the "end point" was reached at which time the vicosity of the system began to decrease. A flocculant white precipitate settled out. This was recovered by filtration. The thus recovered organic-modified bentonite was washed twice with water to eliminate soluble impurities.

The thus washed material (organic-modified clay) was air-dried and then dried at about 120° C. until substantially free of water. This drying (at ca. 120° C.) required about an hour. The thus dried organic-modified clay was suspended in a mixture of tetrahydrofuran and carbon tetrachloride using about 4 parts of carbon tetrachloride to one part of the organic-modified clay to produce a suspension having a solid content of about 2%; this dispersion, or suspension, was labeled "Suspension I."

EXAMPLE II

A latex (an aqueous dispersion) of a vinylidene chloride-methyl acrylate copolymer having a solid content of about 60%, was coated on a glass plate using a Baker Film Applicator Bar to adjust the thickness of the resulting coat, or film. The resulting film was dried for about 3 minutes at about 125° C., thereby to produce a film having a thickness of about 0.4 mil. A dispersion of the organic-modified bentonite prepared in Example I (i.e., Suspension I) was coated upon the thus prepared film, using a Baker Film Applicator Bar, and dried at about 125° C. for about 3 minutes. This resulted in a film, or layer, of organic-modified clay having a dry thickness of about 0.03 mil. adhering to the previously prepared film of vinylidene chloride-methyl acrylate copolymer. The thus formed layer of organic-modified clay was coated with a layer of the aforesaid vinylidene chloride-methyl acrylate latex using a Baker Film Applicator Bar to adjust the thickness of the coating which was then dried for about 3 minutes at 125° C. The resulting laminate was stripped from the glass surface.

The permeability of the dried transparent film to oxygen was measured and found to be less than 0.34 cc. (STP) $\times$ mil/atm. $\times$ m.$^2$ $\times$ day at 35° C.

this contrasts with a value of about 3.40 cc. (STP) $\times$ mil/atm. $\times$ m.$^2$ $\times$ day at 35° C.

for a film prepared from the same latex but without the addition of the organic-modified clay filler.

EXAMPLE III

The general procedure of Example II was repeated, but in this instance the procedure was modified by applying a second coating of the latex to the first coating, after drying the first coating to form a first film, before applying the dispersion of organic-modified clay. The second coating of latex was dried at about 125° C. before adding the coating of organic-modified clay. The combined thickness, after drying, of the two coatings of polymer film was about 0.7 mil. This film was then coated with a layer of organic-modified clay suspension (Suspension I) which was dried to give a clay film of about 0.025 mil. Two coatings of the vinylidene chloride-methyl acrylate copolymer latex were applied to the organic-modified clay coating, or layer, after drying said layer. One coating, or layer, of latex was applied on top of the modified clay layer and dried before adding another latex layer thereto. The last applied latex layer was then dried. This produced a laminate film bonded to a glass substrate; said film had a total thickness of about 1.4 mil. The resulting laminate was stripped from the glass surface to yield a self-supporting laminate film. This laminate film was tested for permeability to moist oxygen. Its permeability to moist oxygen was less than 0.34 cc. (STP) $\times$ mil/atm. $\times$ m.$^2$ $\times$ day at 35° C.

EXAMPLE IV

The general procedure of Example I was repeated. However, in this instance vermiculite was used rather than bentonite and Arquad 2HT, (a dialkyl $C_{16}$, $C_{18}$ dimethyl quaternary ammonium chloride dispersed in a mixture of trichloroethylene and tetrahydrofuran) was used rather than the Arquad 2C of Example I. Also, in this instance the organic-modified mineral (organic-modified vermiculite), after drying, was suspended in a mixture of tetrahydrofuran and trichloroethylene (about 4 parts of trichloroethylene to one part of tetrahydrofuran) to form a suspension ("Suspension IV") containing about 3% solid.

EXAMPLE V

A latex comprising about 50% by weight of a copolymer of vinylidene chloride and ethyl acrylate in water was coated on a glass surface using a Baker Film Applicator Bar to give a film having a thickness, after drying (for about 3 minutes at about 130° C.) of about 0.5 mil. A layer of the organic-modified vermiculite prepared in Example IV (Suspension IV) was coated upon the thus dried latex film, and dried for about 3 minutes at about 130° C., thereby to yield a film, or layer, of organic-modified vermiculite having a thickness of about 0.03 mil on the latex film. A layer of the above-described vinylidene chloride ethyl acrylate latex was coated onto the organic-modified vermiculite layer using a Baker Film Applicator Bar, and dried at about 130° C. for about 3 minutes. This give a layer of latex film about 0.4 mil thick on top of the layer of organic-modified vermiculite. The resulting laminate film was stripped from the glass surface and tested for permeability. Its permeability to moist air was found to be less than 0.34 cc. (STP) $\times$ mil/atm. $\times$ m.$^2$ $\times$ day at 35° C.

EXAMPLE VI

A copolymer of vinylidene chloride and ethyl acrylate was dissolved in tetrahydrofuran to yield a solution containing about 10% solid. A coating of this solution was applied to a glass substrate using a Baker Film Applicator Bar and dried for about 3 minutes at about 125° C., thereby to give a dry film having a thickness of about 0.4 mil. A second coating of the aforesaid vinylidene chloride-ethyl acrylate solution was applied to this film and dried at about 125° C. for about 3 minutes. The resulting film (that which was applied in two applications) had a thickness of about 0.7 mil. The thus prepared film was coated with a coating, or layer, of the organic-modified bentonite suspension prepared in Example I (Suspension I) and dried at about 125° C. for 3 minutes to yield a film of organic-modified bentonite having a thickness of about 0.02 mil. The clay layer was then overcoated with two successive layers of the aforesaid solution of vinylidene chloride-ethyl acrylate copolymer in tetrahydrofuran; each overcoating was dried for about 3 minutes at about 125° C. (with a drying step following each application of the copolymer solution). The copolymer coatings were applied with a Baker Flm Applicator Bar. The resulting laminate had a thickness of about 2 mil. This laminate was stripped from the glass substrate and its permeability to oxygen was measured and found to be less than 0.34 cc. (STP)×mil/atm.×m.²×day at 35° C.

EXAMPLE VII

The general procedure of Example VI was repeated; however, in this instance a copolymer of vinylidene chloride and vinyl chloride was dissolved in dioxane. The results were substantially identical to those obtained in Example VI.

EXAMPLE VIII

The general procedure of Example II was repeated; however, in this instance a sheet of polyester film (ca. 1 mil thick) was used in place of the glass surface as backing, or substrate, for the laminate. The polyester film was coated with a thin layer (i.e., ca. 0.01 mil dry thickness) of Hercoprime (an atactic polypropylene in an aromatic solvent) and the solvent was evaporated to form a film of polypropylene bonded to the sheet of polyester film before applying the first coating of polymer latex to the resulting film of polypropylene. The resulting laminate was substantially nonpermeable to air and oxygen—including moisture-laden air and moisture-laden oxygen.

EXAMPLE IX

A copolymer of vinylidene chloride and vinyl chloride was dissolved in tetrahydrofuran to produce a solution containing about 10% of said copolymer. A first coating of this solution was applied to a paperboard surface, the wet coating was drawn down with a Baker Film Applicator Bar and the solvent was evaporated; the resulting film was dried for about 3 minutes at about 125 C., thereby to yield a dry first polymer film having a thickness of about 0.4 mil laminated to a substrate (the paperboard surface). A second coating of said solution of copolymer was applied in a similar fashion, the solvent was evaporated, and the film was dried as before. This resulted in the formation of a film having a total thickness of about 0.7 mil laminated to the paperboard surface. A coating of Suspension I was applied to the thus prepared polymer film. The coating of organic-modified bentonite was drawn down and dried for about 3 minutes at about 125° C., thereby to form a film, or layer, of organic-modified bentonite filler having a thickness of about 0.04 mil on the previously prepared polymer film surface. Said modified bentonite clay film, or layer, was then overcoated with a coating (called the third coating) of the aforesaid polymer solution. Said coating of polymer solution was applied in the same fashion as the aforesaid first polymer coating. The solvent was evaporated, and the resulting third polymer film was dried for about 3 minutes at about 125° C.; the third film, or layer, of copolymer was overcoated with a fourth coating of the polymer solution in the same fashion that the aforesaid first polymer film was overcoated with the aforesaid second coating of polymer solution. The solvent was evaporated from the fourth polymer coating and the resulting film was dried at about 125° C. for about 3 minutes. The resulting laminate comprised a paperboard substrate laminated to a primary film of polymer, a film of filler (organic-modified bentonite) laminated to the primary film of polymer, and a secondary film of polymer laminated to the film of filler. The primary and secondary films of polymer were each about 0.35 mil/thick and the film of filler was about 0.04 mil thick. The resulting structure was substantially nonpermeable to gases including moisture-laden oxygen and humid air. By "humid air" is meant air having a relative humidity of about 50–95% at about 35° C.

EXAMPLE X

The general procedure of Example II was repeated. However, in this instance a portion of Suspension I was modified by adding thereto about 2%, based on the dry weight of the organic-modified clay filler in said Suspension I, of polyvinyl methyl ether, thereby to yield a modified suspension which was substituted, in the instant example, for the Suspension I used in Example II. The resulting laminate film was stripped from the glass surface (substrate). The permeability of this film to moist oxygen and humid air was less than 0.34 cc. (STP)×mil/atm.×m.²×day at 35° C.

It was found that incorporation of the polyvinyl methyl ether into the dispersion of modified clay from which the layer, or film, of filler was prepared rendered the laminate film of this example more flexible than the laminate film of Example II. That is, bending the film prepared according to this example 180° around a ½-inch mandrel and flexing said film 10 times did not increase the permeability of said film to moist oxygen. An identical bending and flexing treatment greatly increased the moist oxygen permeability of the laminate film of Example II.

EXAMPLE XI

The general procedure of Example X was repeated. However, in this instance the polyvinyl methyl ether of Example X was replaced with about 2%, based on the dry weight of organic-modified clay filler in Suspension I, of polyethylene oxide and the polished glass surface of Example X was replaced with a smooth metal surface. The results obtained with the laminate film of the instant example (which was stripped from the metal surface, or substrate) were substantially identical to those obtained with the laminate film of Example X. In other words, incorporation of polyethylene oxide into the modified clay filler rendered the laminate film of this example more flexible than the laminate film of Example II.

EXAMPLE XII

The general procedure of Example II was repeated. However, in this instance the clay from which the layer of film of clay was prepared was *not* modified (i.e., the clay film was *not* treated with a quaternary ammonium compound). The resulting film was stripped from the surface on which it was formed, thereby to form a self-supporting laminate film. The permeability of this self-supporting laminate film to dry oxygen was less than 0.34 cc. (STP)×mil/atm.×m.²×day at 35° C.

but the permeability of said film to moist oxygen (i.e., oxygen about 50–95% saturated with water vapor at about 35° C.) was about 34.0 cc. (STP)×mil/atm.×m.²×day at 35° C.

EXAMPLE XIII

A suspension of about 2% bentonite clay in water at about 60° C. was agitated with rapid stirring and treated with sodium polyphosphate as a dispersing and exfoliating agent. About 0.5% sodium polyphosphate, based on the weight of the clay present, was added. When dispersion was substantially complete, after about 2 hours, stirring was discontinued and a small amount of larger unexfoliated clay particles and a few particles of rock, silica, and the like were allowed to settle out. The dispersion was decanted from the particles which had settled, thereby to obtain a dispersion of a purified clay-like material—purified bentonite clay. The purified bentonite clay was recovered from the dispersion by centrifugation and redispersed in water to give a dispersion containing about 8% of said clay; this dispersion was designated "Dispersion XIII."

A latex (i.e., an aqueous dispersion) of a copolymer of vinylidene chloride and vinyl chloride having a solid content of about 40% was mixed with a sufficient quantity of the above-mentioned Dispersion XIII to produce a composition, or slurry, containing about 15% of said purified bentonite clay and 85% copolymer based on the solid content of the resulting slurry, or composition. After mixing the composition thoroughly, a quantity of it was applied as a first coating to a smooth glass surface and drawn down with a Baker Film Applicator Bar. The coating was drawn to such thickness that, after drying at about 125° C. for about 3 minutes, a first layer of a filled polymer film having a thickness of about 0.5 mil resulted. A second coating of the aforesaid composition, of substantially the same thickness as the first coating, was applied to said first coating and dried using the same application, drawing, and drying procedure that was used with said first coating, thereby to fill pinholes in the first layer of polymer film and to produce a film having a total thickness of about 1 mil and consisting of a film of clay filled polymer laminated, or bonded to a substrate (the glass surface). This film was stripped from the glass surface.

The permeability of the dried transparent film to dry oxygen was measured and found to be less than 3.40 cc. (STP) $\times$ mil/atm. $\times$ m.$^2$ day at 35° C.

However, the permeability of said film to moist oxygen was only about 34.0 cc. (STP) $\times$ mil/atm. $\times$ m.$^2$ day at 35° C.

The film prepared in the instant example was much more brittle than similar films prepared with modified clay (modified bentonite) fillers, e.g., in Examples II and III. Brittleness is objectionable because if the film, or layer, of filler is fractured, e.g., by bending or flexing, its permeability is increased substantially.

EXAMPLE XIV

A first coating of a vinylidene chloride ethyl acrylate copolymer latex having a solid content of about 55% was applied to a polished metal surface using a Baker Film Applicator Bar to draw the coating down. The resulting wet film was dried at about 130° C. for about 3 minutes; it yielded a dry first film having a thickness of about 0.5 mil bonded to the metal surface.

A dispersion of bentonite clay filler was prepared by adding a sufficient amount of said clay to give a dispersion, or slurry, of about 2% solid content to water, stirring the mixture, and adding thereto sufficient sodium hydroxide to bring the pH to about 8–9, thereby to exfoliate and suspend the clay. The mixture was stirred until dispersion was substantially complete (ca. for about 1.5 hour). The dispersion was then separated (by centrifugation) from a small quantity of large particles, unexfoliated clay, silica, and the like, which had settled to the bottom. The thus separated dispersion was labeled "Dispersion XIV."

A coating of Dispersion XIV was applied to the aforesaid first film using a Baker Film Applicator Bar to draw the wet coating down. The clay film was dried for about 3 minutes at about 130° C., thereby to give a film, or layer, of said filler about 0.04 mil thick. Said clay film was treated with an excess of a solution of Arquad 12–50 (dodecyl trimethyl ammonium chloride) in a hot (ca. 50° C.) mixture of isopropyl alcohol and water for a period of about 5 min. The clay film swelled somewhat during this treatment but it retained its integrity. The excess salt solution was flushed, or washed, from the film with hot water and the wet layer of thus formed organic-modified clay was dried for about 3 minutes at about 130° C., hereby yielding a film, or layer, of modified clay-like material bonded to the aforesaid first film. A second coating of the aforesaid latex was applied to the thus dried clay layer using a Baker Film Applicator Bar to draw the wet coating down. Said second coating was dried at about 130° C. for about 3 minutes, thereby yielding a film of latex having a thickness of about 0.5 mil on top of and bonded to the aforesaid clay layer. The resulting laminate film was stripped from the metal surface, or substrate, upon which it was formed.

The permeability to oxygen of said laminate film was less than 0.34 cc. (STP) $\times$ mil/atm. $\times$ m.$^2$ $\times$ day at 35° C.

EXAMPLE XV

The general procedure of Example I was repeated. However, in this instance the dried organic-modified clay was suspended in water rather than in a mixture of tetrahydrofuran and carbon tetrachloride. Since the organic-modified clay was hydrophobic, about 15%, based on the weight of the organic-modified clay, of a wetting agent (sodium dodecylbenzene sulfonate) was added to the mixture of water and organic-modified clay. The resulting dispersion contained about 2.5% organic-modified clay; said dispersion was labeled "Dispersion XV."

EXAMPLE XVI

The general procedure of Example II was repeated, but in this instance Dispersion XV was substituted for Suspension I. The results were substantially identical to those obtained in Example II.

EXAMPLE XVII

The general procedure of Example I was repeated. However, in this instance the bentonite clay was converted to organic-modified clay by treatment with an aqueous solution of tetramethyl ammonium hydroxide. A suspension of about 3% of the resulting organic-modified clay (bentonite) was labeled "Dispersion XVII."

EXAMPLE XVIII

The general procedures of Examples II, III, VI, VIII, IX, X, and XI were repeated, but, in each instance, the procedure was modified by replacing Suspension I with Dispersion XVII. In each instance the results obtained with Dispersion XVII were substantially identical to those obtained with Suspension I.

EXAMPLE XIX

The general procedure of Example XIV was repeated. However, in this instance the layer of clay was *not* modified (i.e., the clay film was *not* treated with a solution of quaternary ammonium compound). The resulting film was stripped from the surface on which it was formed, thereby to form a self-supporting laminate film. The permeability of this self-supporting laminate film to dry oxygen was less than 0.34 cc. (STP) $\times$ mil/atm. $\times$ m.$^2$ $\times$ day at 35° C.

but the permeability of this film to moist oxygen (i.e., oxygen about 50–95% saturated with water vapor at about 35° C.) was about 3.40 cc. (STP) $\times$ mil/atm. $\times$ m.$^2$ $\times$ day at 35° C.

EXAMPLE XX

The procedure of Example XIV was repeated; however, in this instance about 3% of polyvinyl methyl ether, based on the dry weight of the clay-like mineral (bentonite) present, was added to Dispersion XIV before applying said dispersion to the film formed by drying the coating of latex. The results were substantially identical to those obtained in Example XIV except that it was found that incorporation of the polyvinyl methyl ether into the dispersion of bentonite from which the layer, or film, of filler was prepared rendered the laminate film of this example more flexible than the laminate film of Example XIV. That is, bending the film prepared according to this example 180° around a ½-inch mandrel and flexing said film 10 times did not increase the permeability of said film to moist oxygen. An identical bending and flexing treatment greatly increased the moist oxygen permeability of the laminate film of Example XVI.

EXAMPLE XXI

The general procedure of Example XX was repeated; however, in this instance the polyvinyl methyl ether was replaced by about 5% (based on the weight of the bentonite) of polyethylene oxide. The results were substantially identical to those of Example XX.

EXAMPLE XXII

Five bolts (ca. ½ inch diameter and ca. 2 inches long) were sealed in a first bag made of film prepared by the method of Example II and, as a control, five bolts from the same lot were sealed in a second bag made of polyethylene film having substantially the same thickness as the film used to prepare the first bag. Both bags of bolts were placed on a shelf in an open (non-air-conditioned) shop and left there during the hot humid summer months (about 3 months) under conditions of high humidity (relative humidities of up to at least about 98%). At the end of the summer the two bags of bolts were opened and their contents were examined. Bolts in the control (polyethylene) bag were rusted while those in the first bag showed no visible evidence of rust.

Similar tests were run using bags made from films prepared according to the procedures of Examples III, V, VI, VII, VIII, X, XI, and XIV; bolts sealed in these bags did not rust, but bolts sealed in polyethylene bags (made of polyethylene films having substantially the same thickness as the films prepared according to the aforesaid examples) were rusted.

EXAMPLE XXIII

The general procedure of Example II was repeated, but in this instance the vinylidene chloride-methyl acrylate copolymer latex was replaced with a polyvinyl chloride (PVC) copolymer latex having a solid content of about 50%. The resulting self-supporting laminate was of excellent quality and had a permeability to oxygen of less than $$0.34 \text{ cc. (STP)} \times \text{mil/atm.} \times \text{m.}^2 \times \text{day at } 35° \text{ C.}$$

Self-supporting laminate films of excellent quality, each having a permeability to oxygen of less than $$0.34 \text{ cc. (STP)} \times \text{mil/atm.} \times \text{m.}^2 \times \text{day at } 35° \text{ C.}$$

were obtained in a series of other runs wherein the PVC of Example XXIII was replaced by copolymers of vinyl chloride and acrylonitrile, polyvinyl acetate, copolymers of vinyl acetate and ethylene, polyvinyl methyl ether, and vinyl acrylic terpolymers.

As used in the specification and claims of this application: (a) The term percent (%) means percent by weight unless otherwise defined where used; (b) The term cc. means cubic centimeters; (c) The term mil means 0.001 inch; (d) The term STP means "standard temperature and pressure" (i.e., one atmosphere and 0° C.); (e) The term atm. means atmosphere (i.e., 760 millimeters of mercury); (f) The term day means 24 hours; (g) The term m.$^2$ means square meter; (h) A. means Angstrom units; and (i) The term parts means parts by weight unless otherwise defined where used.

As used herein the term "organic-modified clay-like mineral-filler" means a clay-like mineral filler prepared from a clay-like mineral having platelike, or platelet, structure, i.e., an axial ratio of about 20–300:1, said clay-like mineral having been modified by treatment with a quaternary ammonium compound having aliphatic radicals of 1–20 carbon atoms. The term "clay-like mineral-filler" (unless otherwise defined, qualified or explained where used) means an organic-modified clay-like mineral-filler prepared from a clay-like mineral having a platelike or platelet structure, i.e., an axial ratio of about 20–300:1.

Clay-like minerals having a platelike (or platelet) structure which have given excellent results where used to prepare the laminates of this invention include vermiculite, montmorillonite, mica, and platelike talc, platelike clays and the like; and, as used herein the term "clay-like mineral filler having a platelet (or a platelike) structure" means such minerals.

Film-forming polymers which have given excellent results where used to prepare the laminates of our invention include polyvinylidene chloride copolymers, polyvinyl chloride (PVC) and its copolymers, polyvinyl acetate and its copolymers, and the like.

We claim:

1. A self-supporting laminate having a permeability to gases of less than about $$2 \text{ cc. (STP)} \times \text{mil/atm.} \times \text{m.}^2 \times \text{day at about } 35° \text{ C.,}$$

said laminate consisting essentially of:
   (a) a substrate; and
   (b) a filled polymer film, the film consisting essentially of a film-forming polymer selected from the group consisting of vinyl and vinylidene homopolymers and copolymers filled with a clay-like mineral filler having a platelike structure and having been modified by a quaternary ammonium compound having aliphatic radicals of 1–20 carbon atoms, the weight ratio of said filler to said polymer being about 1:0.2–200, bonded to said substrate.

2. The laminate of claim 1 in which the substrate is a member selected from the group consisting of paper, paperboard, polyolefins, polyvinyl chloride and its copolymers, polyvinylidene chloride copolymers, polyesters, polyvinyl acetate and its copolymers, cloth, and wood.

3. The laminate of claim 1 in which the weight ratio of polymer to clay-like mineral filler, in the filled polymer film is about 1:05–99.

4. The laminate of claim 1 in which the substrate is about 0.05–50 mils thick and the filled polymer film is about 0.005–2 mils thick.

5. The laminate of claim 1 in which the polymer component of the filled polymer is a member selected from the group consisting of polyvinylidene chloride copolymers, polyvinyl acetate and its copolymers, and polyvinyl methyl ether.

6. The laminate of claim 1 in which said modified clay-like mineral is selected from the group consisting of vermiculite, mica, platelike clays, and platelike talc.

7. A self-supporting laminate having a permeability to gases of less than about $$2 \text{ cc. (STP)} \times \text{mil/atm.} \times \text{m.}^2 \times \text{day at about } 35° \text{ C.}$$

said laminate consisting essentially of:
   (a) a substrate;
   (b) a filled polymer film, said film consisting essentially of a film-forming polymer selected from the group consisting of vinyl and vinylidene homopolymers and copolymers filled with a clay-like mineral filler having a platelike structure and having been modified by a quaternary ammonium compound having aliphatic radicals of 1–20 carbon atoms bonded to said substrate, the weight ratio of said filler to said polymer being about 1:0.2–200; and
   (c) an unfilled polymer film consisting essentially of a film-forming polymer bonded to the filled polymer film.

8. The laminate of claim 7 in which the substrate is a member selected from the group consisting of paper, paperboard, polyolefins, polyvinyl chloride and its copolymers, polyvinylidene chloride copolymers, polyesters, polyvinyl acetate and its copolymers, cloth, and wood.

9. The laminate of claim 7 in which the weight ratio of polymer to clay-like mineral filler in the filled polymer film is about 1:0.5-99.

10. The laminate of claim 7 in which the substrate is about 0.05-50 mils thick, the filled polymer film is about 0.005-2 mils thick and the second polymer film is about 0.02-50 mils thick.

11. The laminate of claim 7 in which the polymer component of the filled polymer is a member selected from the group consisting of polyvinylidene chloride copolymers, polyvinyl chloride and its copolymers, polyvinyl acetate and its copolymers, and polyvinyl methyl ether.

12. The laminate of claim 7 in which said modified clay-like mineral is a clay-like mineral selected from the group consisting of vermiculite, mica, platelike clays, and platelike talc.

13. The laminate of claim 7 in which the unfilled polymer film is a polymer selected from the group consisting of polyvinyl chloride and its copolymers, polyvinylidene chloride copolymers, polyvinyl acetate and its copolymers, and vinyl acrylic terpolymers.

14. A self-supporting laminate having a permeability to gasses of less than about 2 cc. (STP) $\times$ mil/atm. $\times$ m.$^2$ $\times$ day at about 35° C.

said laminate consisting essentially of:
 (a) a substrate;
 (b) a first film, said first film consisting essentially of a clay-like mineral filler having a platelike structure and having been modified by a quaternary ammonium compound having aliphatic radicals of 1-20 carbon atoms bonded to the substrate; and
 (c) a second film, said second film consisting essentially of a film-forming polymer selected from the group consisting of vinyl and vinylidene homopolymers and copolymers, bonded to the first film.

15. The laminate of claim 14 in which the substrate is a member selected from the group consisting of paper, paperboard, polyolefins, polyvinyl chloride and its copolymers, polyvinylidene chloride copolymers, polyesters, polyvinyl acetate and its copolymers, cloth, and wood.

16. The laminate of claim 14 in which said modified clay-like mineral is a clay-like mineral selected from the group consisting of vermiculite, mica, platelike clays, and platelike talc.

17. The laminate of claim 14 in which the second film is a member selected from the group consisting of polyvinyl chloride and its copolymers, polyvinylidene chloride copolymers, polyvinyl acetate and its copolymers, and vinyl acrylic terpolymers.

18. The laminate of claim 14 in which the substrate is about 0.05-50 mils thick, the first film is about 0.002-0.20 mil thick and the second film is about 0.05-50 mils thick.

References Cited

UNITED STATES PATENTS

| | | |
|---|---|---|
| 2,892,804 | 6/1959 | Crissey. |
| 3,085,731 | 4/1963 | Wilkins. |
| 3,111,419 | 11/1963 | Nahin. |
| 3,230,750 | 1/1960 | Horbury et al. ____ 117—135.1 |
| 3,428,483 | 2/1969 | Owens. |

WILLIAM D. MARTIN, Primary Examiner

R. HUSACK, Assistant Examiner

U.S. Cl. X.R.

117—161, 138.8, 155, 148, 72, 135.1, 132, 124, 75, 132; 161—162, 163